Sept. 25, 1962  O. FROLAND  3,056,006
SECTIONALIZING SWITCH
Filed July 18, 1960  3 Sheets-Sheet 1

INVENTOR.
OLAV FROLAND
BY
Fred Wiviott
ATTORNEY.

Sept. 25, 1962  O. FROLAND  3,056,006
SECTIONALIZING SWITCH
Filed July 18, 1960  3 Sheets-Sheet 2

INVENTOR.
OLAV FROLAND
BY
Fred Wivrott
ATTORNEY.

Sept. 25, 1962 O. FROLAND 3,056,006
SECTIONALIZING SWITCH
Filed July 18, 1960 3 Sheets-Sheet 3
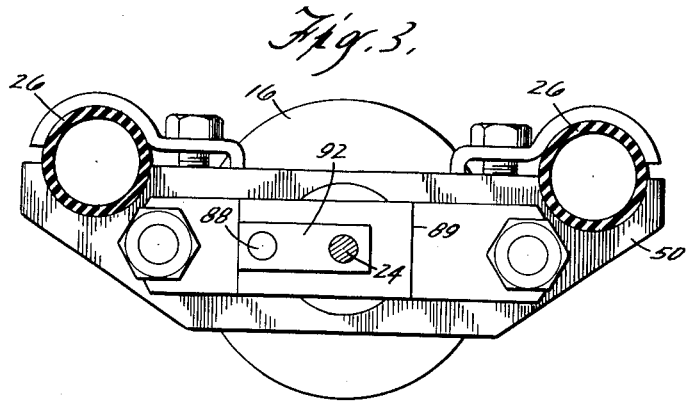
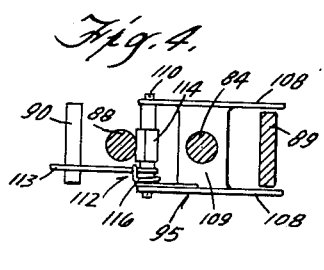 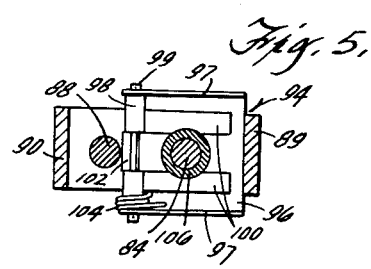
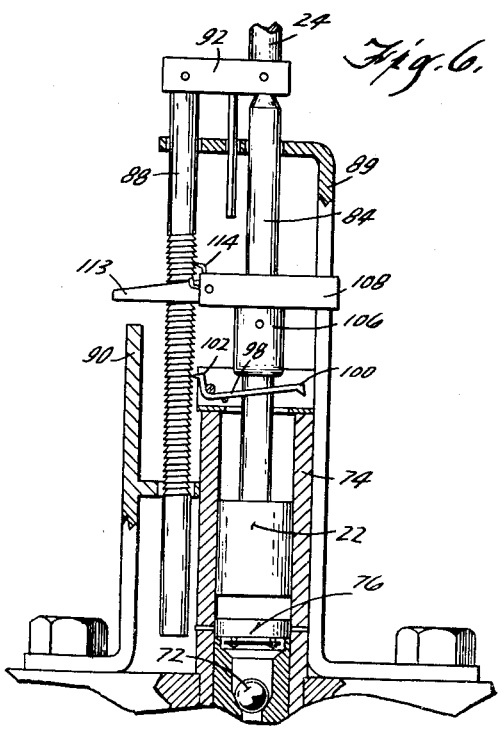 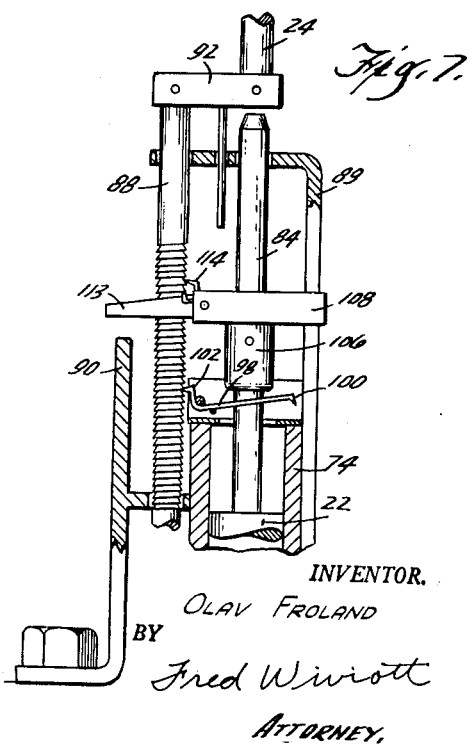
INVENTOR.
OLAV FROLAND
BY Fred Wiviott
ATTORNEY.

United States Patent Office 3,056,006
Patented Sept. 25, 1962

3,056,006
SECTIONALIZING SWITCH
Olav Froland, Milwaukee, Wis., assignor to McGraw-Edison Company, Milwaukee, Wis., a corporation of Delaware
Filed July 18, 1960, Ser. No. 43,545
10 Claims. (Cl. 200—97)

This invention relates to automatic electrical protective devices and, more particularly, to sectionalizing switches.

It is common practice in distribution systems to employ a recloser or other backup protective device in series with the main distribution line and located adjacent the source of power, and sectionalizer switches in feeder lines radiating from the main line. Because the majority of faults in such systems are temporary in nature, and will clear in a relatively short time, the backup protective devices are usually adjusted to execute a series of rapidly successive opening and reclosing operations upon the occurrence of a fault, during which time the sectionalizer switches remain closed. If the fault has not cleared after a predetermined number of such opening and reclosing operations, usually three, it is then considered permanent, in which case it must be isolated from the source. If the fault occurs in one of the feeder lines, its sectionalizer switch will open subsequent to the third opening operation of the recloser thereby isolating the fault from the source. For this purpose, sectionalizer switches are provided with fault integrating means which count the number of fault current impulses and then operate the sectionalizer switch's opening means, whereupon the faulted feeder line will be isolated from the main line while the circuit to the remaining feeder lines remains intact. This opening of the device's contacts takes place while the recloser is open, so that the sectionalizing switch is not required to have interrupting ability. After the sectionalizing switch in the faulted section has opened, the recloser closes a fourth time, thereby restoring service to the non-faulted feeder lines. If a permanent fault occurs in the main line, on the other hand, the sectionalizing switches will remain inactive as the recloser cycles to lockout, so that when service is restored to the main line, the feeder lines will be immediately energized.

One type of prior art sectionalizing switch utilizes a solenoid for sensing overcurrent impulses and a magnetic pump piston operable upon the occurrence of each impulse to force a measured quantity of hydraulic fluid below an integrating piston. Each of such operations advance the integrating piston a predetermined distance toward a tripping member which is operative to release the switch's main contacts whereby tripping will occur after a preselected number of operations. If the fault disappears before the requisite number of operations, the integrating piston settles to its initial position whereby the device is reset in preparation for another series of operations. It can be seen, however, that some settling of the integrating piston will also occur between interrupting operations. In applications wherein the time between reclosing operations of a recloser is relatively long this resettling of the integrating piston creates a serious problem because if the rate of resettlement is made too rapid the device cannot retain its "count" for the desired length of time and if this rate is too slow the device cannot be rapidly reset.

It is an object of the invention to provide a sectionalizing switch with integrating means that retains its count for a relatively long period of time.

It is another object of the invention to provide in an electrical protective device, hydraulic integrating means having a relatively rapid resetting time.

It is a still further object of the invention to provide for use in a protective device, hydraulic integrating means having a relatively long retention time and a relatively short resetting time.

These and other objects and advantages of the invention will become more apparent from the detailed description of the invention taken with the accompanying drawings in which:

FIG. 3 is a view taken along lines 3—3 of FIG. 2;

FIG. 4 is a view taken along lines 4—4 of FIG. 2;

FIG. 5 is a view taken along lines 5—5 of FIG. 2;

FIGS. 6 and 7 are partial elevational views of the integrating mechanism illustrating its method of operation; and FIG. 8 is a side elevational view partly in section of an alternate embodiment of the instant invention.

In general terms, the invention comprises a hydraulic integrating mechanism for protective devices having trip means and condition sensing means operative upon the occurrence of a predetermined circuit condition to move a hydraulic integrating means a predetermined distance in a switch opening direction, said hydraulic integrating member being operative between fault current impulses to resettle toward its initial position. The mechanism also includes a first means for advancing the trip means in unison with the hydraulic integrating member when the latter advances, and a second means to prevent the resettlement of the trip member until the hydraulic integrating means has moved a predetermined distance toward its initial position.

Figure 1:
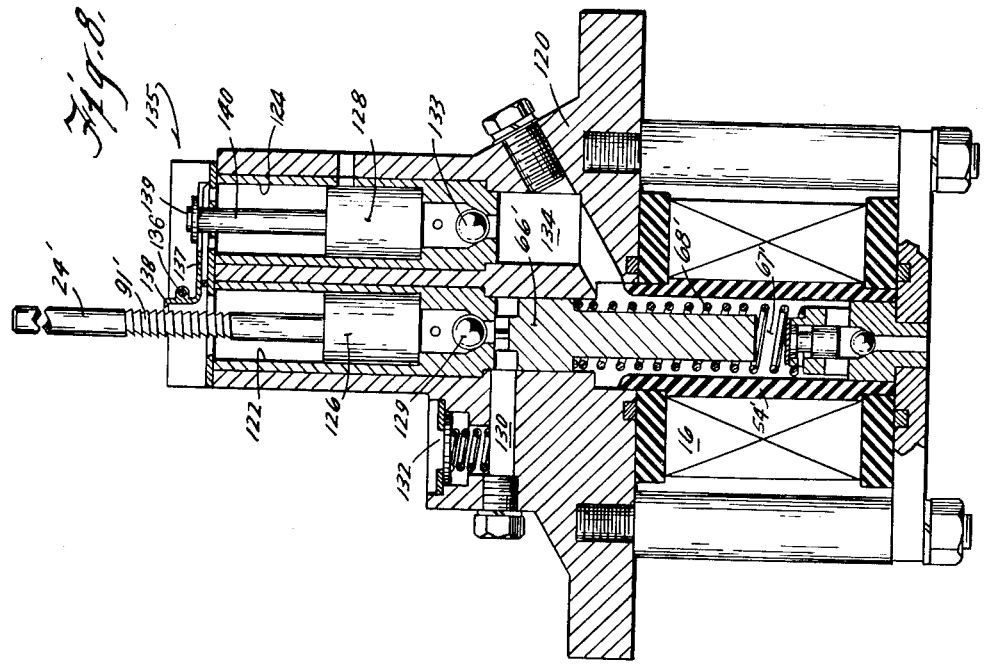
FIG. 1 is a side elevational view with parts broken away of a sectionalizing switch embodying the instant invention.

Referring to the drawings in greater detail, FIG. 1 shows a sectionalizer switch 10 having a metallic tank 11 filled with a dielectric fluid 12, such as oil, and a cover which supports incoming and outgoing porcelain bushings 14 (only one of which is shown) for connection to the line wires (not shown). Bushings 14 extend interiorly of tank 11 and beneath the level of the oil 12. In circuit between bushings 14 are the current responsive solenoid coils 16 of an integrating mechanism 17 and the main switch means 18 comprising stationary contacts 19 and movable contacts 20.

The operation of the integrating mechanism 17 will be explained in greater detail hereinafter, it being sufficient at this point to state that each time a fault current traverses the solenoid coil 16 an associated integrating member 22 will be operative to move a vertically extending trip rod 24 upward a predetermined distance.

The integrating mechanism 17, contact assembly 18 and a latching assembly 23 are all mounted on a frame member 25 which is supported beneath cover 13 by a plurality of insulating support stringers 26.

The latch assembly 23 includes upper and lower toggle links 28 and 30 respectively which are connected together by a knee pin 32. A contact opening spring 34 extends between knee pin 32 and cover 13 and urges knee pin 32 upward and to the right thereby collapsing the toggle links 28 and 30. Such movement is normally prevented when the assembly is in the closed position shown in FIG. 1 by a latching member 36 pivotally mounted on lower toggle link 30 and which engages the lower end of the upper toggle link 28 to prevent rotation of the toggle links about knee pin 32. Rotation of latch member 36 in a counterclockwise direction under the influence of torsion spring 38 is limited by a stop pin 40 extending laterally from lower toggle link 30. A tripping crank 42 is pivotally mounted on frame 25 and has a vertically extending arm 44 which engages trip member 36. Crank 42 also includes a horizontal arm 46 whose remote end lies in the path of trip rod 24.

It can be seen that the predetermined vertical movement of trip rod 24 will engage horizontal arm 46 of crank 42 to rotate it in a clockwise direction thereby forcing the clockwise rotation of trip member 36 against the influence of torsion spring 38 to release toggle links 28 and 30 for movement under the influence of opening spring 34. An insulating link 48 connects the movable contacts 20 to the lower toggle link 30 so that the release of the toggle linkage operates to move link 48 upwardly to rotate each of the movable contacts 20 about pivot pins 49 and to their open position. The contact assembly 18 and the latching mechanism 23 can be reset by moving the operating handle 51 to its position shown in FIG. 1 from the rotated position it assumes upon the occurrence of a switch opening operation. It will be appreciated too, that the latching mechanism 23 just described is well known in the art and forms no part of the instant invention.

In the foregoing discussion it was stated that each time the overload sensing coil 16 was traversed by a fault current, its integrating member 22 was moved upwardly a predetermined distance. This function is performed by the integrating mechanism 17 shown in detail in FIG. 2 and which is supported between a pair of mounting plates 50 and 52 suspended below base 25 by depending insulating support stringers 26.

Disposed between plates 50 and 52 and secured to each in a hermetically sealed relationship is a tube 54 which supports coil 16 and which also acts as a hydraulic cylinder. Located in the lower end of tube 54 is a magnetic pole member 56 secured to the lower plate 52 and having an axial bore 57 extending therethrough for placing the interior of tube 56 in communication with the ambient oil. The upper portion 58 of bore 57 is recessed to provide a seat 59 for a ball check valve 60 while a damping member 62 is loosely mounted in the upper end of recessed portion 58 for limiting the movement of ball 60. In addition, a pair of lateral ports 64 are provided in each side of recess portion 58 so that oil may flow freely through bore 57 and into the interior of tube 54 when ball 60 is in an elevated position.

A magnetic plunger 66 is located in tube 54 above magnetic member 56 and separated therefrom by a gap 67 in which a compression spring 68 is disposed. Magnetic plunger 66 is also provided with an axial bore 70 and has a ball check valve 72 in its recessed upper portion 73. Secured to the upper end of tube 54 is a tubular extension and guide portion 74 for receiving the upper end of magnetic plunger 66. An impulse valve assembly 76 is affixed by pins 78 in tubular extension 74 above magnetic plunger 66 and is shown to include a check plate 80 reciprocably mounted below an aperture 81 formed in assembly 76 and a compression spring 82 which normally urges plate 80 away from said aperture. This impulse valve assembly 76 tends to prevent oil from surging upward through aperture 81 when plunger 66 is drawn rapidly down and also acts as a stop member for said plunger.

The integrating member 22 is shown to comprise a piston disposed in tubular extension 74 above valve 76 and includes a stem 84 extending upwardly toward the horizontal arm 46 of crank 42.

A coupling assembly 86 for transferring the motion of stem 84 to lockout rod 24 includes a coupling rod 88 mounted for vertical sliding movement by frame members 89 and 90 and which is connected to the lockout rod 24 by a bridging member 92. A pin 93, extending downwardly from member 92 through an aperture in frame member 89, guides rods 24 and 88 in their vertical movement. The coupling assembly also includes first and second pawl assemblies 94 and 95 respectively.

Figure 2:
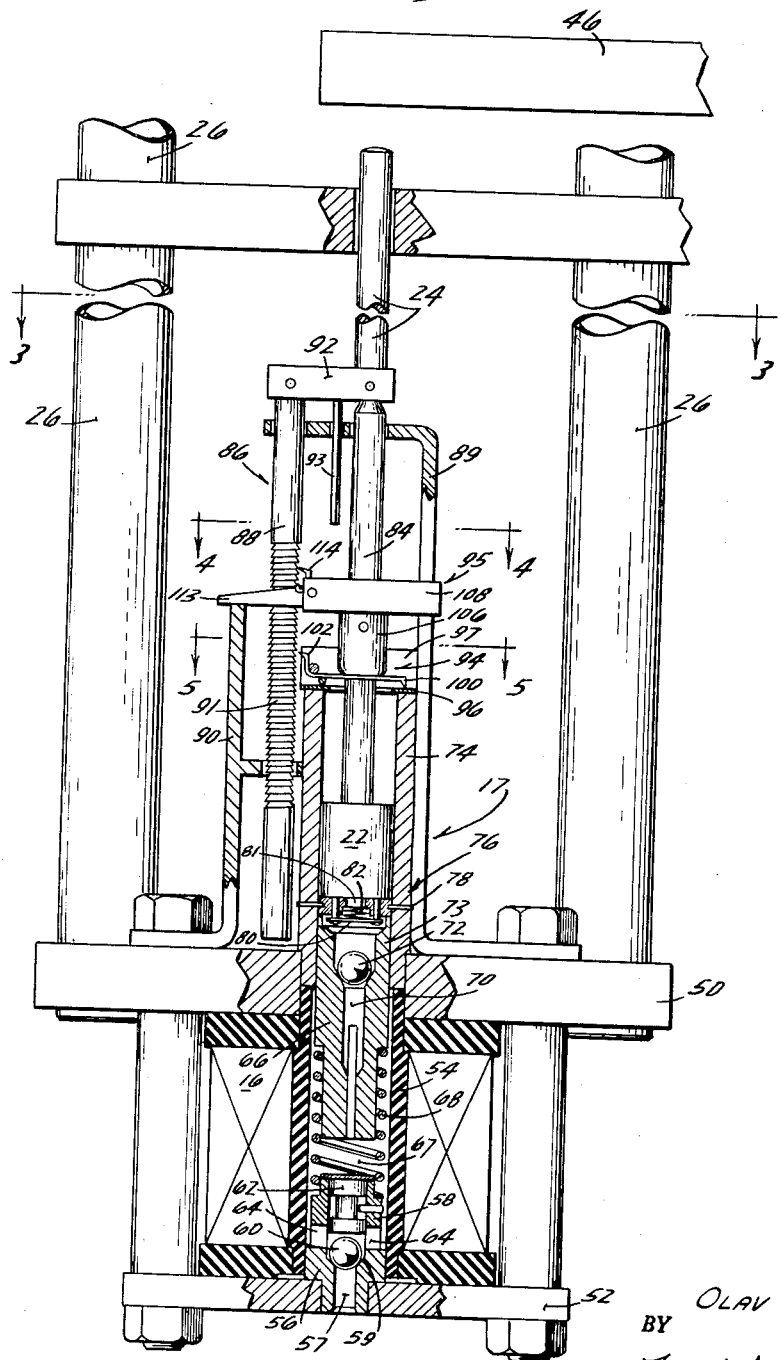
FIG. 2 is a side elevational view, partly in section, of the integrating mechanism according to the instant invention.

The first pawl assembly 94 is shown in FIGS. 2 and 5 to include a base plate 96 secured to the upper end of tubular extension 74 and a pair of parallel side plates 97 disposed on each of the lateral sides of base plate 96. A pawl member 98 is rotatably mounted between plates 96 on a shaft 99 and includes a pair of parallel, rearwardly extending legs 100 and an upwardly extending head portion 102. A torsion spring 104 surrounds shaft 99 and urges pawl member 98 toward rotation in a counterclockwise direction, as viewed in FIG. 2, so that head portion 102 will engage the teeth 91 in coupling rod 88. When the integrating piston 22 is in its undisplaced position, as shown in FIG. 2, however, a sleeve 106 secured to stem 84, engages the upper surface of each of the rearwardly extending legs 100 to rotate pawl 98 in a clockwise direction against the influence of torsion spring 104 and thereby hold head portion 102 out of engagement with the teeth 91 in rod 88.

The second pawl assembly 95 also includes a pair of side plates 108 which are connected to stem 84 by a web 109. A shaft 110 extends between side plates 108 and pivotally supports a pawl member 112 which includes a forwardly extending arm 113 and a head portion 114 each of which is affixed to shaft 110 and which are urged for rotation in a counterclockwise direction by a torsion spring 116. When integrating piston 22 is in its undisplaced position shown in FIG. 2, arm 113 engages frame member 90 to pivot head 114 out of engagement with the teeth 91 in rod 88 and against the influence of torsion spring 116.

Referring now specifically to FIG. 2, each time the current sensing coil 16 is traversed by an overload, its magnetic plunger 66 is attracted downwardly against compression spring 68. This holds ball 60 against its seat 59 so that the oil in gap 67 is forced through bore 70 and above ball 72. When the backup recloser operates to interrupt the fault current, the magnetic attraction between coil 16 and plunger 66 disappears, whereupon compression spring 68 returns magnetic plunger 66 to its initial position in the upper end of tube 54. As magnetic plunger 66 moves upwardly, ball 72 closes bore 70 so that the oil above said plunger is forced past impulse valve 76 and below integrating piston 22 forcing the latter upward a predetermined distance toward trip member 42. In addition, this upward movement of plunger 66 draws ambient oil into gap 67 through bore 57, past ball 60 and through the lateral openings 64 in member 56. The size of the gap 67 will determine the amount of oil that is pumped below integrating piston 22 during each operation thereby controlling its incremental rise.

As the integrating piston 22 rises, sleeve 106 which is secured to stem 84, will move out of engagement with the legs 100 of pawl member 98 thereby allowing spring 104 to rotate head 102 into engagement with the teeth 91 in coupling rod 88. In addition, the upward movement of integrating piston 22 will also move the second pawl assembly 95 upward so that the forwardly extending arm 113 of ratchet member 112 will be moved out of engagement with bracket 91 thereby freeing head portion 114 for rotation in a counterclockwise direction as viewed in FIG. 6 whereupon it engages the teeth 91 in coupling rod 88. This forms a rigid connection between stem 84 and coupling rod 88 so that the continued rise of integrating piston 22 will move said coupling stem and trip rod 24 upwardly toward trip member 42. Because pawl member 98 is affixed to the upper end of tube 74 its head 102 will pivot into and out of engagement with teeth 91 as coupling rod 88 passes.

Upon the completion of the first pumping operation the assembly will be in the position shown in FIG. 6 with integrating piston 22 displaced upwardly a predetermined distance from the impulse valve assembly 76. Because of the rigid connection between stem 84 and coupling rod 88 through the second pawl assembly 95, said coupling rod and trip rod 24 will also be moved upwardly a corresponding distance. At this point it will be recalled that the backup recloser has now interrupted the circuit so that current sensing coil 16 is de-energized. The effect of gravity on integrating piston 22 will cause it to settle a slight distance in tubular extension 74 toward its initial position. However, because torsion spring 104 urges the first pawl member 98 toward rotation in a counterclockwise direction its head 102 will engage teeth 91 to prevent coupling rod 88 from downward movement. On the other hand, because pawl member 112 is free for limited rotational movement in a clockwise direction, its head 114 will slide past teeth 91 as it settles with piston 22 and stem 84. As a result, while the integrating piston 22, the stem 84 and second pawl assembly 95 settle from their position shown in FIG. 6 to their position shown in FIG. 7, the first pawl member 98 holds coupling rod 88 and trip rod 24 in their advanced position.

When the coupling assembly is in the position shown in FIG. 7 the backup recloser will close completing the circuit through coil 16. Should the fault reappear, magnetic plunger 66 will be drawn downwardly to initiate a second pumping operation identical to the first, described above. When integrating piston 22 is again forced upwardly, head 114 of the second pawl assembly 95 will again rotate into engagement with teeth 91 so that coupling rod 88 and trip rod 24 will be moved upwardly a second incremental distance. Also, the upward movement of coupling rod 88 will pivot head 102 of the first pawl member 98 into and out of engagement with teeth 91. After pump piston 22 has reached a second elevated position, it will again begin to settle toward its initial position moving the second pawl assembly 95 downwardly in the manner described above. However, the first pawl assembly 98 will again prevent coupling rod 88 and trip rod 24 from resettling.

If the fault persists for a predetermined number of such operations, trip member 24 will be moved upward a sufficient distance to engage trip crank 42 and thereby open the contact assembly 18 in the manner described above. As a result, sensing coil 16 will remain de-energized so that pump piston 22 will be free to resettle to its initial position. Upon this event, sleeve 106 will again engage the legs 100 of pawl member 98 and thereby rotate its head 102 out of engagement with teeth 91. In addition, the resettling of integrating piston 22 will move arm 113 of the second ratchet member 112 into engagement with bracket 90 so that its head 114 will also be rotated out of engagement with teeth 91. As a result, coupling rod 88 and trip rod 24 are free for rapid resettlement to their initial positions. In the event that the fault disappears after a number of operations which does not result in the opening of contacts 18 the resettlement of integrating piston 22 will also cause the resettling of trip rod 24 and coupling rod 88 in the manner above described.

It can be seen, therefore, that the resettling time of the integrating assembly 17 is governed by the time required for integrating piston 22 to resettle to its initial position. As a result, this resettling time is the same as in most prior art types of hydraulic integrating assemblies. However, the resettling of integrating piston 22 does not result in the resettlement of trip rod 24 until the former has reached its initial position. Hence, the retention time of the assembly is substantially the same as its resetting time. Thus, because a retention time of a few seconds is considered to be relatively long while a resetting time of the same length is considered to be relatively short, a relatively favorable length of time is achieved for each without a sacrifice of the other. In addition, the assembly prevents any resetting of trip piston 24 until resetting occurs.

FIG. 8 illustrates an alternate embodiment of the instant invention in which a head portion 120 replaces mounting plate 50. Head portion 120 has a pair of vertical cylinders 122 and 124 formed in its upper end for receiving a pair of integrating pistons 126 and 128. The lower end of the first cylinder 122 is provided with a ball check valve 129 and is connected by a passage 130 to the ambient through a check valve 132. The second cylinder 124 also is provided with a ball check valve 133 at its lower end and is connected to the upper end of tube 54' through a passage 134 in head 120. A trip rod 24' extends axially from the first integrating piston 126 and is provided with teeth 91' intermediate its end and adjacent the upper end of cylinder 122. A pawl assembly 135, identical to the first ratchet assembly 94 shown in the embodiment of FIGS. 2 and 5, is provided at the upper end of the second cylinder 124. A torsion spring 136 urges pawl member 137 for rotation in a counterclockwise direction so that its head 138 can engage teeth 91'. Such rotation, however, is prevented when the second integrating piston 128 is in its undisplaced position by a washer 139 disposed at the upper end of a stem 140 extending therefrom.

It can be seen that magnetic plunger 66' of the embodiment of FIG. 8 does not have an axial bore and that it is reduced for a substantial portion of its length so that when it is attracted downwardly, upon the occurrence of a fault current through coil 16', the oil in gap 67' will be forced through passage 134, past ball check 133 and below the second integrating piston 128. This will move washer 138 out of engagement with the pawl member 135 so that its head 138 will be free to rotate in a counterclockwise direction and into engagement with the teeth 91'.

In addition, downward movement of magnetic plunger 66' will draw ambient oil into the upper end of tube 54' past check valve 132 and through passage 130. When the backup recloser operates to de-energize coil 16', spring 68' will return magnetic plunger 66' to its initial position shown in FIG. 8 thereby forcing the oil in the upper end of tube 54 past ball check 129 and below the first integrating piston 126 forcing it upwardly a first predetermined distance.

While coil 16' is de-energized the second integrating piston 128 will begin settling toward its initial position. The first integrating piston 126, however, will be prevented from resettling by the engagement of pawl member 137 with teeth 91'. After a predetermined number of such operations trip rod 24' will engage the trip crank 42 thereby opening the device's main contacts. Between each of the integrating operations second integrating piston 128 will resettle toward its initial position but prior to the time that washer 138 engages pawl member 137, a succeeding operation will occur to prevent the release of the first integrating piston 126. However, after the main contacts have opened or after the disappearance of the fault, the second integrating piston 128 will be free to resettle to its initial position thereby engaging pawl member 137 to rotate head 138 out of engagement with teeth 91' so that the first integrating piston 126 is free to resettle.

While only two embodiments of the instant invention have been shown and described, various other embodiments and modifications will be suggested to those skilled in the art. Accordingly, it is intended to cover in the appended claims, all such modifications and embodiments that fall within the true spirit of the invention.

I claim:

1. In a protective device having switch means, and latching means for holding said switch means in closed position, the combination of, trip means movable into engagement with said latching means so that said switch means is released for movement toward its open position, hydraulic integrating means operative upon each occurrence of a predetermined circuit condition to move an incremental distance, means for advancing said trip means toward said latching means each time said hydraulic integrating means advances, whereby said switch means will be opened after a predetermined number of such integrating operations, said hydraulic integrating means being operative between occurrences of said circuit condition to resettle toward its initial position, and means for preventing the movement of said trip means toward its initial position when the hydraulic integrating means resettles until the latter has moved to within a predetermined distance of its initial position whereupon said trip means is released.

2. In a protective device having switch means, and latching means for holding said switch means in closed position, the combination of, trip means movable into engagement with said latching means so that said switch means is released for movement to its open position, hydraulic integrating means, condition sensing means operative upon each occurrence of a predetermined circuit condition to move said hydraulic integrating means an incremental distance, means for advancing said trip means an incremental distance toward said latching means each time said hydraulic integrating means advances, whereby said switch means will be opened after a predetermined number of such integrating operations, said hydraulic integrating means being operative between occurrences of said circuit condition to resettle a portion of said incremental distance toward its initial position, coupling means for preventing the movement of said trip means toward its initial position when the hydraulic integrating means resettles, and release means operable to uncouple said trip means for movement toward its initial position after said hydraulic integrating means has resettled to within a predetermined distance of its initial position.

3. In a protective device having switch means and latching means for holding said switch means in closed position, the combination of, a trip member movable into engagement with said latching means so that said switch means is opened, hydraulic integrating means, condition sensing means in circuit with said switch means and operative upon each occurrence of a predetermined circuit condition to move said hydraulic integrating means an incremental distance, said hydraulic integrating means being operative between occurrences of said current condition to resettle toward its initial position, said trip member having a plurality of ratchet teeth formed therein, means for advancing said trip means an incremental distance toward said latching means each time said hydraulic integrating means advances, pawl means adjacent said trip member and engageable therewith to prevent the movement of said trip member when the hydraulic integrating means resettles until the latter has moved to within a predetermined distance of its initial position.

4. In an oil immersed protective device having switch means and latching means for holding said switch means in closed position, the combination of, trip means movable into engagement with said latching means so that said switch means is released for movement toward its open position, an overcurrent coil in circuit with said switch means, hydraulic integrating means including a cylinder and an integrating piston, a magnetic plunger reciprocable into said cylinder each time a predetermined overcurrent flows through said coil to force a quantity of hydraulic fluid beneath said integrating piston whereby the latter is moved an incremental distance, said integrating piston being operative between fault current impulses to resettle a portion of said incremental distance toward its initial position, means for advancing said trip means an incremental distance toward said latching means each time said integrating piston advances, and coupling means for preventing the movement of said trip member when the integrating piston means resettles until the latter has moved to within a predetermined distance of its initial position.

5. In a protective device having switch means and latching means for holding said switch means in closed position, the combination of, an elongate trip member movable into engagement with said latching means so that said switch means is opened, an overcurrent coil in circuit with said switch means, hydraulic integrating means including an integrating piston, a cylinder and a magnetic plunger reciprocable into said cylinder each time a predetermined overcurrent flows through said coil to force a quantity of hydraulic fluid beneath said integrating piston whereby the latter is moved an incremental distance, said integrating piston being operative between fault current impulses to resettle a portion of said incremental distance toward its initial position, said trip member having a plurality of ratchet teeth formed therein, means for advancing said trip means an incremental distance toward said latching means each time said hydraulic integrating means advances, pawl means adjacent said trip member and engageable therewith to prevent the movement of said trip member when the hydraulic integrating means resettles, and release means mounted on said integrating piston and operable to disengage said pawl means when said integrating piston has moved to within a predetermined distance of its initial position.

6. In a protective device having switch means, and latching means for holding said switch means in closed position, the combination of, trip means movable into engagement with said latching means so that said switch means is released for movement to its open position, hydraulic integrating means, condition sensing means operative upon each occurrence of a predetermined circuit condition to move said hydraulic integrating means an incremental distance, a first coupling means operable to connect said trip means to said hydraulic integrating means for advancing said trip means an incremental distance toward said latching means each time said hydraulic integrating means advances, whereby said switch means will be opened after a predetermined number of such integrating operations, said hydraulic integrating means being operative between fault current impulses to resettle a portion of said incremental distance toward its initial position, coupling means for preventing the movement of said trip member toward its initial position when the hydraulic integrating means resettles, and release means operable to uncouple said trip means for movement toward its initial position after said hydraulic integrating means has resettled to within a predetermined distance toward its initial position.

7. In a protective device having switch means and latching means for holding said switch means in closed position, the combination of, an elongate trip member movable into engagement with said latching means for releasing said switch means for movement toward its open position, hydraulic integrating means, condition sensing means in circuit with said switch means and operative upon the occurrence of a predetermined circuit condition to move said hydraulic integrating means a predetermined distance toward said trip means, said hydraulic integrating means being operative between fault current impulses to resettle toward its initial position, said trip member having a plurality of ratchet teeth formed therein, a first pawl means mounted on said hydraulic integrating means and engageable with said ratchet teeth for advancing said trip means in unison with the hydraulic integrating means when the latter advances, a second pawl means adjacent said trip member and engageable therewith to prevent the movement of said trip member when the hydraulic integrating means resettles until the latter has moved a predetermined distance toward its initial position.

8. In a protective device having switch means and latching means for holding said switch means in closed position, the combination of, an elongate trip member movable into engagement with said latching means so that said switch means is opened, an overcurrent coil in circuit with said switch means, hydraulic integrating means including an integrating piston, a cylinder and a magnetic plunger reciprocable into said cylinder each time a predetermined overcurrent flows through said coil to force a quantity of hydraulic fluid beneath said integrating piston whereby the latter is moved an incremental distance, said integrating piston being operative between fault current impulses to resettle a portion of said incremental distance toward its initial position, said trip member having a plurality of ratchet teeth formed therein, a first pawl means mounted on said integrating piston for engaging said ratchet teeth whereby said trip means is advanced an incremental distance toward said latching means each time said hydraulic integrating means advances, a second pawl means adjacent said trip member and engageable therewith to prevent the movement of said trip member when the hydraulic integrating means resettles, and release means mounted on said integrating piston and operable to disengage said pawl means when said integrating piston has moved to within a predetermined distance of its initial position.

9. In a protective device having switch means and latching means for holding said switch means in closed position, the combination of, trip means movable into engagement with said latching means so that said switch means is released for movement toward its open position, first and second hydraulic integrating means, condition sensing means operative upon each occurrence of a predetermined circuit condition to move each of said hydraulic integrating means an incremental distance, said trip means being connected to said first hydraulic integrating means for movement an incremental distance toward said latching means each time said first hydraulic integrating means advances, whereby said switch means will be opened after a predetermined number of such integrating operations, said second hydraulic integrating means being operative between fault current impulses to resettle a portion of said incremental distance toward its initial position, coupling means for preventing the movement of said first hydraulic integrating means toward its initial position when the second hydraulic integrating means resettles, and release means operable to uncouple said first hydraulic integrating means for movement toward its initial position after said second hydraulic integrating means has moved a predetermined distance toward its initial position.

10. In a protective device having switch means and latching means for holding said switch means in closed position, the combination of, trip means movable into engagement with said latching means so that said switch means is released for movement toward an open position, hydraulic integrating means operative on each occurrence of a predetermined circuit condition to move an incremental distance, coupling means operatively associated with said trip means and said integrating means and operative to advance said trip means a predetermined distance toward said latching means each time said hydraulic integrating means advances, whereby said switch means will be released after a predetermined number of integrating operations, said hydraulic integrating means being operative to resettle toward its initial position between each occurrence of said circuit condition, said coupling means preventing the movement of said trip means toward its initial position when the hydraulic integrating means resettles, said coupling means being releasable to allow movement of said trip means to its initial position when said hydraulic integrating means has resettled to within a predetermined distance of its initial position.

References Cited in the file of this patent

UNITED STATES PATENTS

| | | |
|---|---|---|
| 2,752,451 | Wallace | June 26, 1956 |
| 2,769,054 | Edwards | Oct. 30, 1956 |
| 2,777,031 | Wallace | Jan. 8, 1957 |